No. 788,607. PATENTED MAY 2, 1905.
E. T. SHERMAN.
SLIDE FOR MAGIC LANTERNS OR THE LIKE.
APPLICATION FILED JUNE 22, 1904.
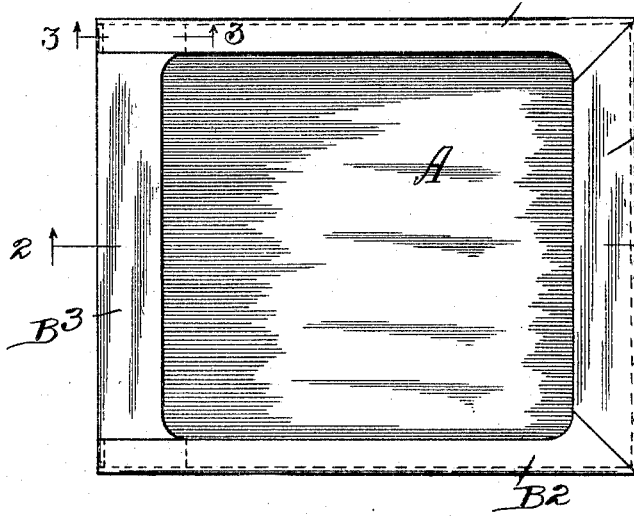
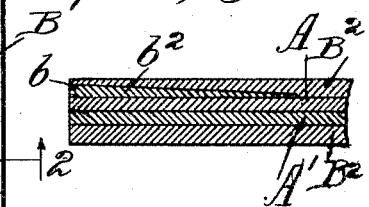
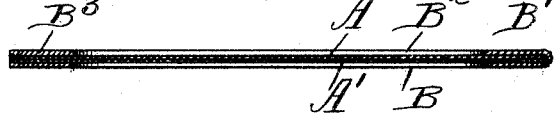
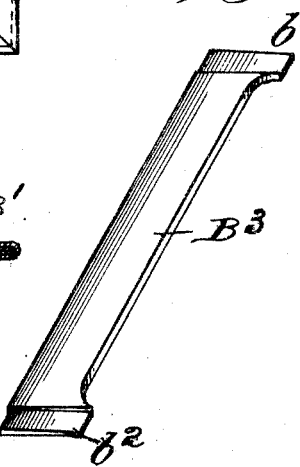
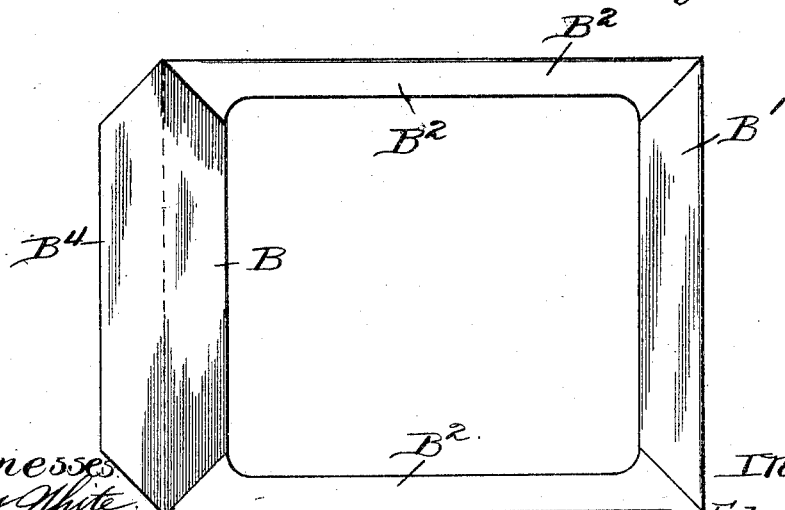
Witnesses
Ray White
Harry R. L. White
Inventor
Edwin T. Sherman
By Charles H. Shea Atty.

No. 788,607.

Patented May 2, 1905.

UNITED STATES PATENT OFFICE.

EDWIN T. SHERMAN, OF CHICAGO, ILLINOIS.

SLIDE FOR MAGIC LANTERNS OR THE LIKE.

SPECIFICATION forming part of Letters Patent No. 788,607, dated May 2, 1905.

Application filed June 22, 1904. Serial No. 213,691.

*To all whom it may concern:*

Be it known that I, EDWIN T. SHERMAN, a citizen of the United States, and a resident of Chicago, Cook county, Illinois, have invented certain new and useful Improvements in Slides for Magic Lanterns or the Like; and I do hereby declare that the following is a full, clear, and exact description of the same, reference being had to the accompanying drawings, and to the letters of reference marked thereon, which form a part of this specification.

This invention relates to slides for optical instruments, such as magic lanterns and other instruments adapted for projection. Heretofore the slides used for projection have been made of a glass plate of suitable size upon one face of which a view is provided in any suitable manner and against which is secured another glass plate adapted to protect the view-face of the plate from being injured or defaced by scratching or otherwise. Where so constructed, the plates, being of double thickness of glass, are of such weight as to render them inconvenient for handling or transportation in any considerable quantities, and, furthermore, owing to the fragile nature of the plate are so easily broken as to entail considerable loss through accident or careless handling.

The object of this invention is to provide a slide the plates of which are practically non-breakable and of very light weight as compared with slides heretofore used.

It is also an object of the invention to provide a construction adapted to permit an amateur photographer or others to produce their own plates of cheap and easily-obtainable material and to afford a strong, light, and durable construction for all purposes of projection.

The invention embraces many novel features; and it consists in the matters hereinafter described, and more fully pointed out and defined in the appended claims.

In the drawings, Figure 1 is a plan view of a slide embodying my invention. Fig. 2 is a section taken on line 2 2 of Fig. 1. Fig. 3 is an enlarged section taken on line 3 3 of Fig. 1. Fig. 4 is a perspective view of the binding-strip. Fig. 5 is a plan view of a slightly-modified construction of the means for closing the frame.

As shown in said drawings, the plate comprises two sheets A and A', of gelatin, mica, celluloid, or other light and flexible transparent films, laid flat together, and upon the inner side of one of which is provided the picture or view it is desired to project, and the other of which protects the same in the usual manner. Said films forming the plate are permanently or temporarily engaged in a strong light frame, such as aluminium or other suitable material. As shown, said frame comprises a sheet of metal B, stamped to provide an aperture therethrough having rounded inner angles for the exposure of the plate and which is folded or bent up at the edges to afford the oppositely-disposed flanges or side members $B^2$ and the end member B', which fit closely down upon the plate, as shown in Figs. 2 and 3, and which are stamped to afford round inner angles when closed inwardly corresponding with those in the back B. At their front ends the side flanges, the under sides of which are tapered upwardly toward the extremity, as shown in Fig. 3, are provided at the extremity with a short downturned lip $b$. The front end of the frame is closed by means of a binding strip or bar $B^3$, provided at each end with an extension of less thickness tapering toward the inner side of said bar adapted to slide beneath the tapered ends of the side flanges $B^2$, as shown in Fig. 3. Said tapered ends $b^2$ are cut away on the outer side to receive the lip $b$, so that when the binding-bar $B^3$ is pushed into position, as shown in Fig. 1, it acts to press the margins of the films or plate firmly together, binding the same upon the back of the frame B, and is firmly locked in position by the lip $b$.

The operation is as follows: From the construction described it will be seen that the plate, howsoever constructed, may be readily slid into place in the frame and the front end thereof closed, affording a sufficient support on all margins of the plate to prevent injury from the heat of the projector. Furthermore, if a plate should become damaged or for any reason it should be desired to substitute one plate for another in a given frame the binding-bar B³ may be removed and the change effected without difficulty. Owing to the extreme lightness of the construction and the fact that the plates are not subject to injury by breakage, as is the case with the glass plates heretofore used, it will be seen that the device is much more convenient for transportation than has heretofore been the case. The thickness of the frame projecting beyond the film also serves as a guard and protects the films or plates, thus enabling many more slides to be contained in an ordinary carrying-box.

If preferred, the front end of the frame may be provided with a forwardly-extending flange B⁴, integral with the back B and which is adapted to be bent over the front margin of the film when secured in place. If preferred, a crease or bending-line may be provided, as shown in dotted lines in Fig. 5, to facilitate the bending thereof into position. When so constructed, the flange may be bent outwardly to permit the views being changed in a given frame should it ever be desired.

Obviously details of construction may be varied without departing from the principle of my invention.

I claim as my invention—

1. As an article of manufacture, a slide for projectors comprising a transparent, flexible sheet having a view thereon, a frame of rigid material engaging said sheet acting to hold the same flat, and means adapted to wedge between said frame and said sheet.

2. A slide for projectors comprising a rigid frame adapted to be opened at one end, and flexible sheets of transparent material engaged thereon, the inner face of one having a view thereon, and a binding-bar adapted to lock in the open end of the frame when the sheets are in position.

3. A projector-slide of flexible transparent sheet, a binding-frame acting to hold said sheet flat and a bar provided with inwardly-beveled ends adapted to secure removably said sheet in said frame.

4. A frame for the purpose specified comprising a sheet of metal cut to afford a central opening to expose the view and provided with beveled lateral flanges and detachable means beveled complementally therewith binding the plate or view.

5. A frame of the class described comprising a sheet of metal apertured centrally to expose the view and having turned-over flanges thereon to bind the view-plate thereto, said flanges being beveled at one end and detachable means engaged beneath said beveled ends adapted to detachably engage the sheet.

6. A frame of the class described comprising a one-piece integral back provided with a central opening, side flanges bent over to engage the view-plate thereto, and provided with outwardly-beveled ends, a binding-bar shaped at its ends to engage beneath said beveled ends and acting to removably engage the view-plate, and an inturned lip adapted to engage said bar in place.

7. An open frame having on one side resilient inturned flanges adapted to engage a sheet thereto, each of said flanges having at corresponding ends an inclined face on the under side thereof and a downturned lip at the extremity and a removable binding-bar adapted to slide beneath the ends of said flanges and to be engaged by said lip.

8. An open frame, inturned flanges thereon adapted to bind a sheet therein and a wedge member engaging at its ends beneath opposite flanges and binding the sheet to the back and a lip on one of said members acting to engage the other, thereby locking the wedge member in place.

In testimony whereof I have hereunto subscribed my name in the presence of two subscribing witnesses.

EDWIN T. SHERMAN.

Witnesses:
C. W. HILLS,
HJALMAR S. RUDD.